United States Patent [19]

Flanyak et al.

[11] 4,133,897
[45] Jan. 9, 1979

[54] PREPARATION OF JUICY, SELF-BASTING SAUSAGE-LIKE FOOD PRODUCTS

[75] Inventors: John R. Flanyak, Wheaton; Herbie R. Norton, Hoffman Estates, both of Ill.

[73] Assignee: Miles Laboratories, Inc., Elkhart, Ind.

[21] Appl. No.: 846,595

[22] Filed: Oct. 28, 1977

[51] Int. Cl.² .............................................. A23J 3/00
[52] U.S. Cl. .................................... 426/250; 426/574; 426/646; 426/802
[58] Field of Search ............... 426/104, 105, 250, 574, 426/646, 802

[56] References Cited

U.S. PATENT DOCUMENTS

| | | | |
|---|---|---|---|
| 3,711,291 | 1/1973 | Leidy et al. | 426/574 |
| 3,713,837 | 1/1973 | Leidy et al. | 426/250 |
| 3,719,499 | 3/1973 | Hai et al. | 426/574 |
| 3,836,678 | 9/1964 | Leidy et al. | 426/104 X |
| 3,919,435 | 11/1975 | Feldbrugge et al. | 426/574 |
| 3,922,352 | 11/1975 | Tewey et al. | 426/574 X |

*Primary Examiner*—Robert A. Yoncoskie
*Attorney, Agent, or Firm*—Richard W. Winchell

[57] ABSTRACT

A juicy, self-basting sausage-like food product is prepared by the following steps: (a) forming a protein binder slurry containing 20 to 32% water, 3 to 8% albumen, 0.5 to 4% caseinate and 0 to 2.5% vegetable protein isolate; (b) adding 3 to 15% vegetable oil to the slurry; (c) vigorously agitating the oil-containing slurry to form a protein-oil emulsion; (d) forming a textured protein mixture containing 30 to 40% cooked gluten, 1 to 14% textured vegetable protein and 0 to 4% water; (e) blending the protein-oil emulsion and the textured protein mixture together; (f) blending 3 to 15% vegetable oil with the combined mixture; (g) shaping the resulting mixture to a desired form; and (h) heating the shaped mixture to set the protein in a stable, physical form, said percents being weight percent based on the total weight of the product.

6 Claims, No Drawings

PREPARATION OF JUICY, SELF-BASTING SAUSAGE-LIKE FOOD PRODUCTS

BACKGROUND AND PRIOR ART

For many years, food scientists have devoted a great deal of time to developing methods for preparing synthetic meat products from secondary plant and animal sources. Many methods are therefore known for producing a variety of meat-like and sausage-like products.

Methods for preparing meat-like products from "chewy protein gels" are described in U.S. Pat. Nos. 2,802,737; 2,813,024; 2,813,025; 2,830,902 and 2,833,651. The pH of an aqueous mixture of soy or peanut protein is adjusted to a pH above 6.0 and the mixture is heated to form the "chewy protein gel". Proteinaceous filaments, flavors, colors and the like can also be added to the protein gel to simulate the desired meat-like product.

Sausage analogs are prepared, as described in U.S. Pat. No. 3,836,678, by heating a mixture of non-fibrous gelable soy protein isolate and a material selected from albumin, casein, whey and mixtures thereof to form a permanent protein gel. Additives mixed with the protein, preferably before heating, contribute to produce various sausage-type products.

Another method for preparing a meat analog is described in U.S. Pat. No. 3,919,435. The analog is formed from a protein gel precursor which has incorporated animal fatty tissue and/or vegetable oil with a thermostable, polymeric, carbohydrate gel such as alginate or pectin. The carbohydrate gel partially prevents or minimizes apparent emulsification of the fatty tissue and/or vegetable oil. The protein gel precursor is heat-set to form the analogs.

In the December 1976 issue of *Food Processing*, p. 71, a juicy cholesterol-free sausage analog is described which requires no fat or oil when it is fried. The analog utilizes specially developed ingredient systems involving cellulose gums in combination with textured soy protein, gum emulsion stability systems and flavor systems which must be blended in the proper sequence and quantity for this purpose.

SUMMARY OF THE INVENTION

In accordance with the present invention, a process is provided for preparing a juicy, self-basting sausage-like product which simulates the overall characteristics of such sausage meat compositions as pork sausage links, skinless links, sausage patties and the like. These novel sausage-like products are prepared by the following steps of (a) forming a protein binder slurry containing 20 to 32% water, 3 to 8% albumin, 0.5 to 4% caseinate and 0 to 2.5% vegetable protein isolate; (b) adding 3 to 15% vegetable oil to the slurry; (c) vigorously agitating the oil-containing slurry to form a protein oil emulsion; (d) forming a textured protein mixture containing 30 to 40% cooked gluten, 1 to 14% textured vegetable protein and 0 to 4% water; (e) blending the protein-oil emulsion and the textured protein mixture together; (f) blending 3 to 15% vegetable oil with the combined mixture; (g) shaping the resulting mixture to a desired form; and (h) heating the shaped mixture to set the protein in a stable, physical form, said percents being weight percent based on the total weight of the product.

DESCRIPTION OF THE INVENTION

The term "sausage-like" food product is intended to describe food products which resemble meat products that require shaping and heat curing of a meat-emulsion system.

The term "self-basting" is intended to describe a food product which liberates significant amounts of fat or oil upon cooking, thus eliminating the necessity for adding oil during consumer preparation.

The vegetable oils suitable in this invention include soybean oil, corn oil, partially hardened, hydrogenated vegetable oils and mixtures thereof.

The caseinates are compounds of casein with a metal, such as sodium caseinate, potassium caseinate, calcium caseinate, and the like.

Vegetable protein isolate, such as soy isolate, is a commercially available material containing at least 90 weight percent protein.

Cooked gluten, such as wheat gluten, is well known and is prepared by heating an aqueous dispersion of vital gluten sufficient to denature the protein into a spongy, chewy structure. The cooked gluten contains about 65 to 75% by weight water and 25 to 35% by weight denatured gluten. The cooked gluten is then ground into uniform small pieces about ⅛ to ½ inch in diameter.

The textured vegetable proteins include synthetically textured proteins and naturally textured proteins. Synthetically textured proteins include proteinaceous fibers or filaments as described in U.S. Pat. Nos. 2,682,466 and 3,953,613; proteinaceous extrudates as described in U.S. Pat. Nos. 3,102,031; 3,488,770 and 3,940,495; and scraped protein films as described in U.S. Pat. Nos. 3,840,679 and 3,973,044, and the like. Naturally textured proteins or proteins having natural texture include cereal grain groats or grits such as oat groats.

The process also preferably incorporates about 4 to 6 percent flavors, seasoning, spices and color agents. The suitable flavors, seasonings, spices and color are well known and their selection is within the knowledge of those skilled in the art.

The other ingredients used in this process are well known commercially available materials.

Specific mixtures and processing steps for preparing the sausage-like products of this invention are set forth in the above "Summary of the Invention". The processing steps are critical to prepare a juicy, self-basting sausage analog. It is important that the protein oil emulsion be separately prepared and then blended with the textured protein mixture and further that additional oil be added to the combined mixture. If all the ingredients are merely emulsified together, there will result a dry sausage analog which will not liberate any oil or fat when cooked.

The preferred process employs a protein binder slurry containing 23 to 27% water, 4 to 6% albumin, 1 to 4% caseinate and 0 to 2.0% vegetable protein isolate; 4 to 10% vegetable oil is added to the protein binder slurry; the textured protein mixture contains 33 to 37% cooked gluten, 4 to 11% textured vegetable protein and 0 to 4% water; and 3 to 10% vegetable oil is added to the combined mixtures.

The sausage-like mixtures are shaped into a desired form by well known means employed to shape their meat sausage counterparts. For example, the mixtures may be stuffed into collagen casings to form skinned links; stuffed into cellulose castings which are removed after heating to form skinless links; shaped in molds to form patties or a combination of encompassing means may be used to shape the mixture.

To stabilize the physical form, the shaped sausage-like mixtures are heated. For example, the shaped mixture can be subjected to dry heat (10 to 15% humidity) at about 160° to 180° F. for a sufficient time to denature the protein and to harden the casing if one is used; or the shaped mixture can be subjected to steam cooking at 180° to 200° F. for a sufficient time to denature the protein or a combination of heating means may be employed.

The following examples are illustrative of the innovative aspects of this invention.

EXAMPLE 1

This example illustrates the application of this process to the preparation of a collagen cased sausage link.

The following ingredients were combined and mixed for about 5 minutes to form a protein binder slurry:

| Ingredient: | Amount* |
| --- | --- |
| Albumin | 4.9% |
| Calcium caseinate | 2.0% |
| Flavor seasoning, spice and color | 4.8% |
| Other (vitamin blend, starch) | 0.5% |
| Water | 25.2% |

*Amounts herein are expressed as percents by weight based on the total weight of the product.

To the protein binder slurry, the following ingredient was added and vigorously mixed with the slurry to form a protein-oil emulsion.

Soybean oil 10.6%

The following ingredients were combined to form a textured protein mixture:

| Cooked wheat gluten | 36.4% |
| --- | --- |
| Extruded protein granules | 3.0% |
| Steel cut oat groats | 4.2% |

The protein-oil emulsion was then blended with the textured protein mixture. After mixing the combined mixture for about 5 minutes, the following ingredients were added and thoroughly blended with the mixture:

| Soybean oil | 3.0% |
| --- | --- |
| Partially hydrogenated vegetable oil | 5.4% |
| | 100.0% |

The resulting mixture was then stuffed into a 17 mm collagen casing (Devro) employing conventional equipment for this purpose to form a sausage-like link. The collogen cased mixture was then heated at 160° F., 10 to 15% humidity, for 25 minutes to denature the protein and to harden the casing. Following dry heating, the product was steam heated at 180° F. for 30 minutes. The product was cooled and frozen.

To cook the product it was heated for 8 to 10 minutes in a Teflon ® coated pan over moderate heat. During this heating, the sausage-like link released oil for lubrication and heat transfer and was self-basting. When the cooked sausage was evaluated by a sensory panel, it was described as having a good bite, chewy, juicy, fatty, meaty and spicy.

EXAMPLE 2

This example illustrates the application of the instant process to prepare a skinless sausage-like link.

The following ingredients were combined and mixed for about 5 minutes to form a protein binder slurry:

| Ingredients | Amount |
| --- | --- |
| Albumin | 5.3% |
| Sodium caseinate | 2.0% |
| Flavor, seasoning, spice and color | 5.6% |
| Other (vitamins, starch) | 0.5% |
| Soy protein isolate (Supro 620) | 2.2% |
| Water | 26.2% |

To the protein binder slurry, the following ingredient was added and vigorously mixed with the slurry to form a protein-oil emulsion:

| Soybean oil | 5.9% |
| --- | --- |

The following ingredients were combined to form a textured protein mixture:

| Cooked wheat gluten | 33.5% |
| --- | --- |
| Extruded protein granules | 3.5% |
| Water | 3.5% |

The protein-oil emulsion was then blended with the textured protein mixture. After mixing the combined mixture for about 5 minutes, the following ingredients were added and thoroughly blended with the mixture:

| Soybean oil | 6.7% |
| --- | --- |
| Partially hydrogenated vegetable oil | 5.0% |
| Other (guar gum) | 0.1% |
| | 100.0% |

The resulting mixture was then stuffed into a cellulose casing. The cellulose cased mixture was dry heated at 180° F., 10–15% humidity, for 40 minutes. Following this dry heating, the product was steam heated at 200° F. for 30 minutes and then cooled. The cellulose casing was removed to produce a skinless sausage-like link.

The links were cooked in a Teflon ® coated pan for 8 to 10 minutes over moderate heat. During this heating, the sausage-like links released oil for lubrication and heat transfer and were self-basting. A sensory panel evaluated the cooked product and described it as having a good bite, chewy, juicy, fatty, meaty and spicy.

EXAMPLE 3

This example illustrates the critical nature of the instant process steps to produce the desired product.

Two five pound samples were prepared having the following constituents:

| Ingredients | Amount |
| --- | --- |
| Albumin | 4.9% |
| Calcium caseinate | 2.0% |
| Flavor, seasoning, spices and color | 4.8% |
| Soybean oil | 13.6% |
| Partially hydrogenated vegetable oil | 5.4% |
| Cooked wheat gluten | 36.4% |
| Extruded protein granules | 3.0% |
| Steel cut oat groats | 4.2% |
| Water | 25.2% |
| Other (vitamin blend, starch) | 0.5% |
| | 100.0% |

One five pound sample of the above ingredients was added to a Hobart Silent Cutter bowl (Model No. 841810, The Hobart Co., Troy, Ohio) and mixed at 3450 rpm for 3 minutes to emulsify the mixture. The emulsion mix was then stuffed into collogen casings and heat processed as in Example 1. This product is hereinafter referred to as HSC-1.

The other five pound sample of the above ingredients was added to a commercial high speed blender (Model No. CB-5, Waring Products, New Hartford, Connecticut) and mixed at 3600 rpm for 3 minutes to emulsify the mixture. The emulsion mix was then stuffed into collagen casings and heat processed as in Example 1. This product is hereinafter referred to as WCB-5.

Each of the above products was cooked in the same manner described in Example 1. The cooked products, in addition to the product of Example 1, were submitted to a sensory panel for evaluation. The following table illustrates the panel results.

| Sample: | Fat release: | Sensory Panel Comments: |
| --- | --- | --- |
| Example 1 | Very good | Good bite, chewy, juicy, fatty, meaty and spicy. |
| HSC-1 | None | Very dry, particulate, little chew, lacks flavor and spice. |
| WCB-5 | None | Very dry, little spice impact and bland. |

The above results clearly show that the instant processing steps are required to produce a juicy, self basting sausage-like food product.

What is claimed is:

1. A process for preparing a juicy, self-basting sausage-like food product, which comprises (a) forming a protein binder slurry containing 20 to 32% water, 3 to 8% albumin, 0.5 to 4% caseinate and 0 to 2.5% vegetable protein isolate;
(b) adding 3 to 15% vegetable oil to the slurry;
(c) vigorously agitating the oil-containing slurry to form a protein-oil emulsion;
(d) forming a textured protein mixture containing 30 40% cooked gluten in the form of ground pieces, 1 to 14% textured vegetable protein and 0 to 4% water;
(e) blending the protein-oil emulsion and the textured protein mixture together;
(f) blending 3 to 15% vegetable oil with the combined mixture;
(g) shaping the resulting mixture to a desired form; and
(h) heating the shaped mixture to set the protein in a stable physical form, said percents being weight percent based on the total weight of the product.

2. A process according to claim 1, wherein the protein binder slurry contains 23 to 27% water, 4 to 6% albumin, 1 to 4 caseinate and 0 to 2% vegetable protein isolate; wherein 4 to 10% vegetable oil is added to the protein binder slurry; wherein the textured protein mixture contains 33 to 37% cooked gluten, 4 to 11% textured vegetable protein and 0 to 4% water; and wherein 3 to 10% vegetable oil is added to the combined mixture.

3. A process according to claim 1, wherein the protein binder slurry also contains 4 to 6% flavors, seasoning, spices and color agents.

4. A juicy, self-basting sausage-like food product prepared in accordance with the process of claim 1.

5. A juicy, self-basting sausage-like food product prepared in accordance with the process of claim 2.

6. A juicy, self-basting sausage-like food product prepared in accordance with the process of claim 3.

* * * * *